United States Patent
Murasawa et al.

(10) Patent No.: US 10,160,407 B2
(45) Date of Patent: Dec. 25, 2018

(54) NOISE INSULATION STRUCTURE OF AUTOMOTIVE VEHICLE

(71) Applicant: MAZDA MOTOR CORPORATION, Hiroshima (JP)

(72) Inventors: Eiji Murasawa, Hiroshima (JP); Tetsunori Hada, Hiroshima (JP); Masanori Honda, Hiroshima (JP); Akihiro Nishikawa, Hiroshima (JP); Takashi Sasaki, Hiroshima (JP); Yuji Okazaki, Hiroshima (JP); Keisuke Yamakawa, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 150 days.

(21) Appl. No.: 15/439,969

(22) Filed: Feb. 23, 2017

(65) Prior Publication Data

US 2017/0253197 A1 Sep. 7, 2017

(30) Foreign Application Priority Data

Mar. 7, 2016 (JP) .................................. 2016-042978

(51) Int. Cl.
*B60R 13/08* (2006.01)

(52) U.S. Cl.
CPC .................................. *B60R 13/083* (2013.01)

(58) Field of Classification Search
CPC .................................................. B60R 13/083
USPC .................................................... 296/193.07
See application file for complete search history.

(56) References Cited

U.S. PATENT DOCUMENTS

| 6,685,250 B2 | 2/2004 | Misaji et al. | |
|---|---|---|---|
| 9,821,731 B2* | 11/2017 | Dubois | B60R 13/083 |
| 2004/0262935 A1* | 12/2004 | Harima | B60R 13/083 |
| | | | 296/37.3 |
| 2014/0354009 A1* | 12/2014 | Honda | B62D 25/04 |
| | | | 296/187.12 |
| 2016/0311382 A1* | 10/2016 | Murasawa | B60N 3/042 |
| 2018/0050735 A1* | 2/2018 | Jaunasse | B62D 29/004 |

FOREIGN PATENT DOCUMENTS

| CN | 104627250 A | 5/2015 | |
|---|---|---|---|
| DE | 4412427 A1 * | 10/1994 | ........ B60R 13/0861 |
| JP | 2009-061911 A | 3/2008 | |
| JP | 2008-114697 A | 5/2008 | |
| JP | 2008-285026 A | 11/2008 | |
| JP | 2013233838 A * | 11/2013 | ............ B62D 25/04 |
| JP | 2016124436 A * | 7/2016 | |

* cited by examiner

*Primary Examiner* — Pinel E Romain
(74) *Attorney, Agent, or Firm* — Studebaker & Brackett PC

(57) ABSTRACT

A vehicle-body bottom portion comprises a noise-insulation inferior part and a noise-insulation superior part provided adjacently to a periphery of the noise-insulation inferior part. Between the vehicle-body bottom portion and a floor carpet are provided a sound-absorbing member which is arranged between the noise-insulation inferior part and the floor carpet, a cross member which connects the noise-insulation superior part and the floor carpet and seals a gap between the vehicle-body bottom portion and the floor carpet, and a noise insulation space which is adjacent to the sound-absorbing member and the cross member and enclosed by the sound-absorbing member and the cross member.

13 Claims, 6 Drawing Sheets

NOISE INSULATION STRUCTURE OF AUTOMOTIVE VEHICLE

BACKGROUND OF THE INVENTION

The present invention relates to a noise insulation structure of an automotive vehicle, which insulates a noise transmitted to a vehicle inside from a floor face of the vehicle, for example.

There are various noises which occur outside the vehicle during a vehicle traveling, such as a noise generated by a sliding tire on a road surface, a noise radiated from an internal combustion engine or a transmission, or a noise generated by traveling air following outside the vehicle.

There is a concern that in a case in which the above-described noises occurring outside the vehicle are transmitted to the vehicle inside from a floor panel constituting the floor face of the vehicle as a transmitted sound, for example, the comfortability for a passenger may be deteriorated by this transmitted sound. Accordingly, the superior noise insulation to suppress the transmitted sound is required to the automotive vehicle.

U.S. Pat. No. 6,685,250, for example, discloses a noise insulation structure in which a urethane layer, a lower mass layer, a low-resilient urethane layer, an upper mass layer, and a carpet are overlapped in order from below and placed on a steel-made vehicle floor plate which constitutes the floor face of the vehicle. This disclosed structure can constitute a two-degree of freedom-system noise insulation structure, which can secure the high noise insulation superior to a one-degree of freedom-system noise insulation structure.

Meanwhile, Japanese Patent Laid-Open Publication No. 2008-285026 discloses a structure in which a multilayer carpet is placed on a floor panel having a downward recess. This multilayer carpet comprises a spacer arranged in the recess, a sound-absorbing felt material, a noise-insulating sheet, a sound-absorbing felt material and a skin material, which are overlapped in order from below. This disclosed structure can uniform the sinking amount for a pressing load even in a case in which the floor panel has the recess, and secure the superior noise insulation for the noises occurring outside the vehicle.

According to the above-described disclosed multilayer noise insulation structures, however, the number of parts for the noise insulation increases, so that there is a concern that the weight and costs of the vehicle may improperly increase.

SUMMARY OF THE INVENTION

The present invention has been devised in view of the above-described matter, and an object of the present invention is to provide a noise insulation structure of an automotive vehicle which can properly suppress the transmitted sound transmitted to the vehicle inside, having a simple structure with the small number of parts.

The present invention is a noise insulation structure of an automotive vehicle, comprising a partition wall member partitioning a vehicle inside from a vehicle outside, an interior member provided to be spaced apart, toward the vehicle inside, from the partition wall member, and a sound-absorbing member provided between the partition wall member and the interior member, wherein the partition wall member comprises a noise-insulation inferior part which is inferior in vehicle-outside noise insulation and a noise-insulation superior part which is provided adjacently to a periphery of the noise-insulation inferior part and superior to the noise-insulation inferior part in the vehicle-outside noise insulation, and between the partition wall member and the interior member are provided the sound-absorbing member which is arranged between the noise-insulation inferior part of the partition wall member and the interior member, a sealing connection portion which connects the noise-insulation superior part of the partition wall member and the interior member and seals a gap between the partition wall member and the interior member, and a space which is adjacent to the sound-absorbing member and the sealing connection portion and enclosed by the sound-absorbing member and the sealing connection portion.

Herein, the above-described noise-insulation superior part means a portion which is capable of suppressing an aerial vibration which is caused by noises occurring outside the vehicle and transmitted to the interior member more properly than the above-described noise-insulation inferior part.

The above-described partition wall member can be any member which constitutes a vehicle-body lower face, such as a dash panel or a floor face, a vehicle-body side face, such as a door or a fender, or a vehicle-body upper face, such as a bonnet (engine hood) or a roof, for example. The above-described interior member can be any flexible member, such as a floor carpet, or any member having the rigidity, such as a synthetic-resin made trim. The above-described sound-absorbing member can be any member which is made from urethane foam, felt combined with a fiber material, or the like, for example. Herein, it is preferable that the thickness of the sound-absorbing member be set to be 20 mm or smaller. The above-described sealing connection portion is formed separately from the partition wall member, integrally with the partition wall member, or integrally with the interior member. Further, the sealing connection portion can serve as a member which constitutes the noise-insulation superior part of the partition wall member.

The present invention can properly suppress the transmitted sound transmitted to the vehicle inside, having the simple structure with the small number of parts. Specifically, since the space exists between the noise-insulation superior part of the partition wall member and the interior member, the present noise insulation structure can suppress the aerial vibration which is transmitted to the interior member through the noise-insulation superior part by an air spring effect of this space.

Further, since the sound-absorbing member is provided between the noise-insulation inferior part of the partition wall member and the interior member, the present noise insulation structure can suppress the aerial vibration which is transmitted to the interior member through the noise-insulation inferior part by the sound absorption effect of the sound-absorbing member.

Herein, the sound-absorbing member can spread the aerial vibration toward a direction crossing an inward-outward direction. Further, since the space is provided adjacently to the sound-absorbing member, the present noise insulation structure can suppress the aerial vibration which is deflected by the sound-absorbing member and transmitted to the space by the air spring effect of the space.

Thus, the present noise insulation structure can stably suppress the aerial vibration transmitted to the interior member through the noise-insulation inferior part by a synergistic effect of the sound absorption effect of the sound-absorbing member, spreading of the aerial vibration by the sound-absorbing member, and the air spring effect of the space.

Accordingly, the present noise insulation structure can achieve improvement of a transmission loss of a range corresponding to the noise-insulation inferior part and also reduce a difference between that and the transmission loss of a range corresponding to the noise-insulation superior part. Therefore, the present noise insulation structure can properly suppress the transmitted sound transmitted to the vehicle inside, having the simple structure with the small number of parts, and, in particular, can improve the noise insulation of the range corresponding to the noise-insulation inferior part of the partition wall member.

In an embodiment of the present invention, the noise-insulation superior part of the partition wall member comprises a panel member which partitions the vehicle inside from the vehicle outside and a protruding member which includes a flat face provided to be spaced apart, toward the vehicle inside and/or the vehicle outside, from the panel member and is joined to the panel member so as to have a closed cross section.

The above-described protrusion member can be a side frame or a side sill which constitute the vehicle body, a cross member which reinforces the vehicle body, or the like, for example. Herein, the cross section of the protruding member can be any shape of cross section as long as it can form the closed cross section together with the panel member. For example, this protruding member can be the one having a roughly hat-shaped cross section, the one having its inside which has a roughly hat-shaped cross section and is formed in a honeycomb structure, or the like.

The noise insulation structure of the present embodiment can suppress the aerial vibration transmitted to the interior member by means of the mass effect of the protruding member and the air spring effect of an inner space enclosed by the protruding member and the panel member. Accordingly, the present noise insulation structure can improve the noise insulation of the range corresponding to the noise-insulation superior part of the partition wall member, having the simple structure with the small number of parts.

In another embodiment of the present invention, the sealing connection portion is configured to have a longer length, in a vehicle inward-outward direction, than the sound-absorbing member, and the interior member is made integrally by an interior contact portion which contacts the sound-absorbing member, an interior attachment portion which is fixedly attached to the sealing connection portion, and an interior side wall portion which connects the interior contact portion and the interior attachment portion and is provided to be spaced apart from the sealing connection portion. The above-described vehicle inward-outward direction is a specified direction connecting the vehicle outside and the vehicle inside, which can be a vehicle vertical direction, a vehicle longitudinal direction, or a vehicle width direction, for example.

The noise insulation structure of the present embodiment can properly suppress the transmitted sound transmitted to the vehicle inside, having the simple structure with the small number of parts. Specifically, the present noise insulation structure can expand the space adjacent to the sound-absorbing member toward the vehicle inside by the sealing connection portion having a longer length than the sound-absorbing member in the vehicle inward-outward direction and the interior member having the interior side wall portion spaced apart from the sealing connection portion. Thus, the present noise insulation structure can secure the larger-sized space enclosed by the partition wall member, the interior member, and the sealing connection portion, compared with a structure in which the interior side wall portion of the interior member tightly contacts the sealing connection portion.

Herein, it has been found by the inventors of the present invention that the larger the volume of the space enclosed by the partition wall member, the interior member, and the sealing connection portion is, the lower the resonance transmission frequency of the resonance transmission phenomenon which is generated by the partition wall member and the interior member can be made. That is, the present noise insulation structure can make the resonance transmission frequency of the resonance transmission phenomenon properly low and also improve the transmission loss on the high-frequency side which is higher than the resonance transmission frequency.

Further, in a case in which the sound-absorbing member tightly contacts the sealing connection portion and the space is provided adjacently to the vehicle-inside side of the sound-absorbing member, for example, the present noise insulation structure can suppress a decrease of the transmission loss in a band of the resonance transmission frequency by means of the sound-absorbing member. Therefore, the noise insulation structure can properly suppress the transmitted sound transmitted to the vehicle inside, having the simple structure with the small number of parts, by making the space volume large.

In another embodiment of the present invention, the interior side wall portion of the interior member is arranged substantially in perpendicular to the interior contact portion and the interior attachment portion. The noise insulation structure of the present embodiment can create the space which is enclosed substantially in a rectangular shape by the interior member and the sealing connection portion.

The noise insulation structure of the present embodiment can secure the space having the larger volume, compared with a case in which the interior side wall portion is arranged to cross the interior contact portion and the interior attachment portion, and also enhance the air spring effect of the space more properly. Thereby, the present noise insulation structure can surely suppress the aerial vibration transmitted to the interior member through the noise-insulation superior part of the partition wall member.

Additionally, since the interior attachment portion faces the noise-insulation superior part, the present noise insulation structure can provide the large gap between the interior attachment portion and the noise-insulation superior part, thereby lowering the resonance transmission frequency of the resonance transmission phenomenon generated by the interior attachment portion and the noise-insulation superior part more properly. Thereby, the present noise insulation structure can improve the noise insulation of the range corresponding to the noise-insulation superior part of the partition wall member.

Accordingly, since the interior side wall portion is arranged substantially in perpendicular to the interior contact portion and the interior attachment portion, the present noise insulation structure can suppress the transmitted sound transmitted to the vehicle inside more stably.

In another embodiment of the present invention, the partition wall member is a vehicle-body bottom portion of the automotive vehicle, the interior member is a floor carpet, and an air-permeable and resilient spacer is arranged in the space. The above-described spacer can be resilient and porous urethane foam or the like, for example, which can be arranged not to contact the interior member or to contact the interior member.

The noise insulation structure of the present embodiment can compatibly achieve securing of an appropriate cushion performance of the floor carpet and suppressing of the transmitted sound transmitted to the vehicle inside. Specifically, if there is a space between a vehicle-body floor face and a floor carpet, the cushion performance of the floor carpet may deteriorate partially. Consequently, there is a concern that a portion of the floor carpet which corresponds to this space may deform improperly when being pressed by a passenger, so that the passenger may have some uncomfortable feeling.

However, since the spacer having the permeability and the resilience is arranged in the space, the present noise insulation structure can resiliently support the floor carpet by means of the spacer when the floor carpet is pressed by the passenger. Accordingly, the present noise insulation structure can prevent the improper deformation of the floor carpet and restrain the passenger from having the uncomfortable feeling.

Moreover, the arrangement of the spacer in the space can improve the noise insulation of the range corresponding to the noise-insulation superior part of the partition wall member by means of the air spring effect of the space and the sound absorption effect of the spacer.

Thus, the present noise insulation structure can compatibly achieve securing of the appropriate cushion performance of the floor carpet and suppressing of the transmitted sound transmitted to the vehicle inside by means of the spacer arranged in the space.

Other features, aspects, and advantages of the present invention will become apparent from the following description which refers to the accompanying drawings.

DETAILED DESCRIPTION OF THE INVENTION

Hereafter, some embodiments of the present invention will be described referring to the drawings.

EMBODIMENT

Figure 1:
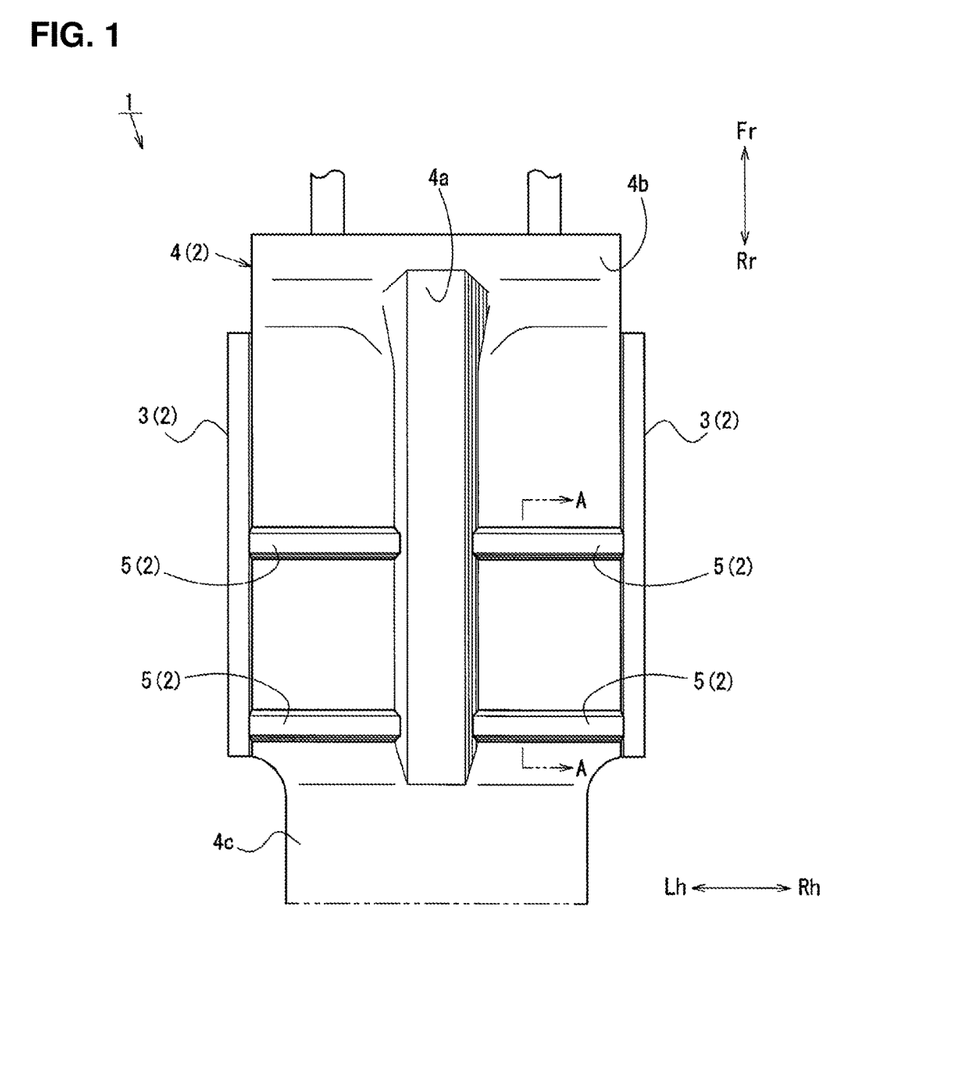
FIG. 1 is a plan view of a vehicle-body bottom portion of an automotive vehicle.
Figure 2:
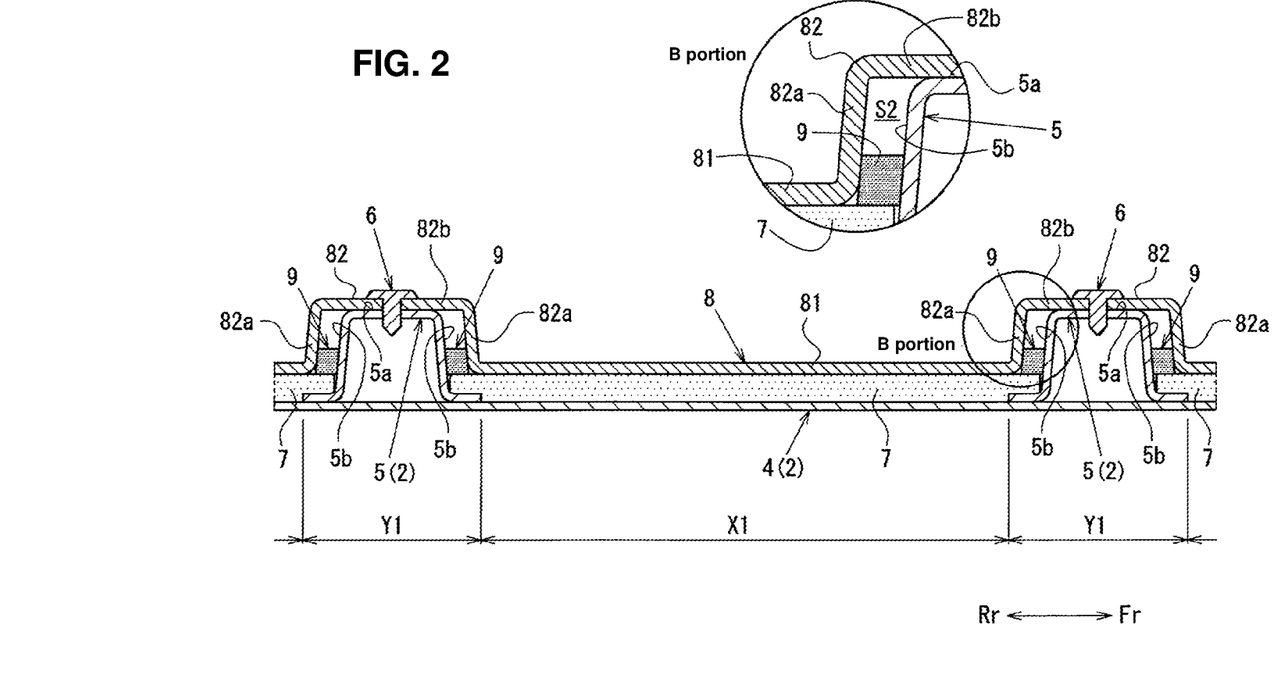
FIG. 2 is a sectional view taken along line A-A of FIG. 1.
Figure 3A:
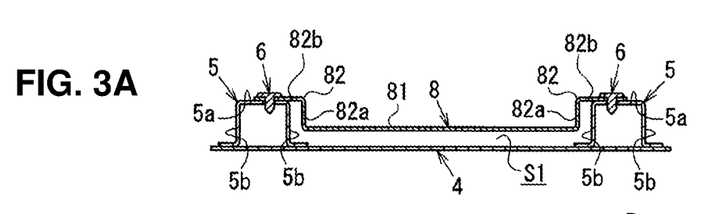
FIGS. 3A, 3B and 3C are explanatory diagrams explaining relationships of a volume of a sealed space and a resonance transmission frequency of a resonance transmission phenomenon.
Figures 3B, 3C:
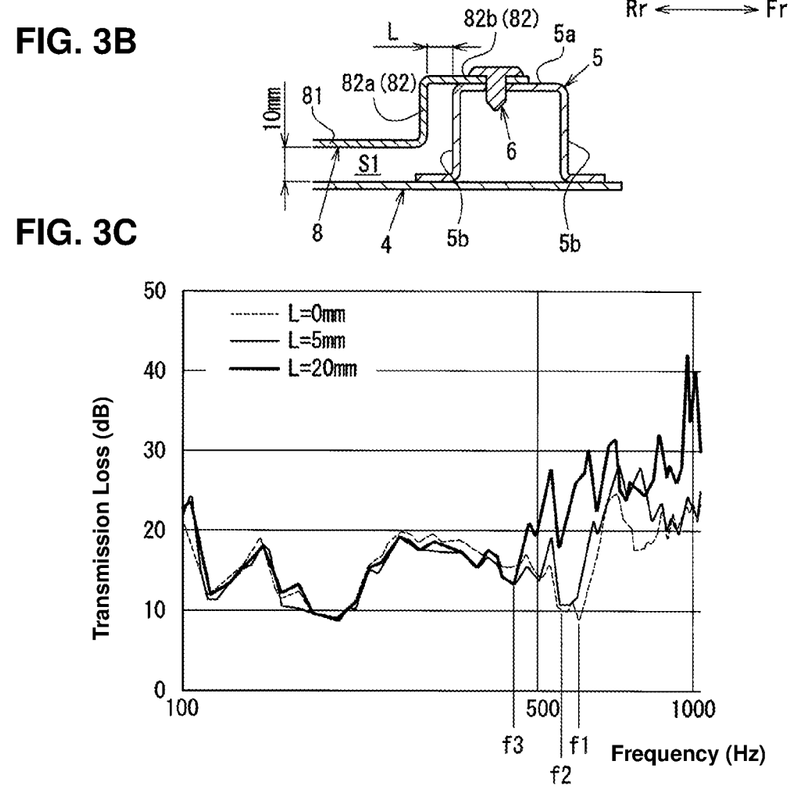
Figure 4:
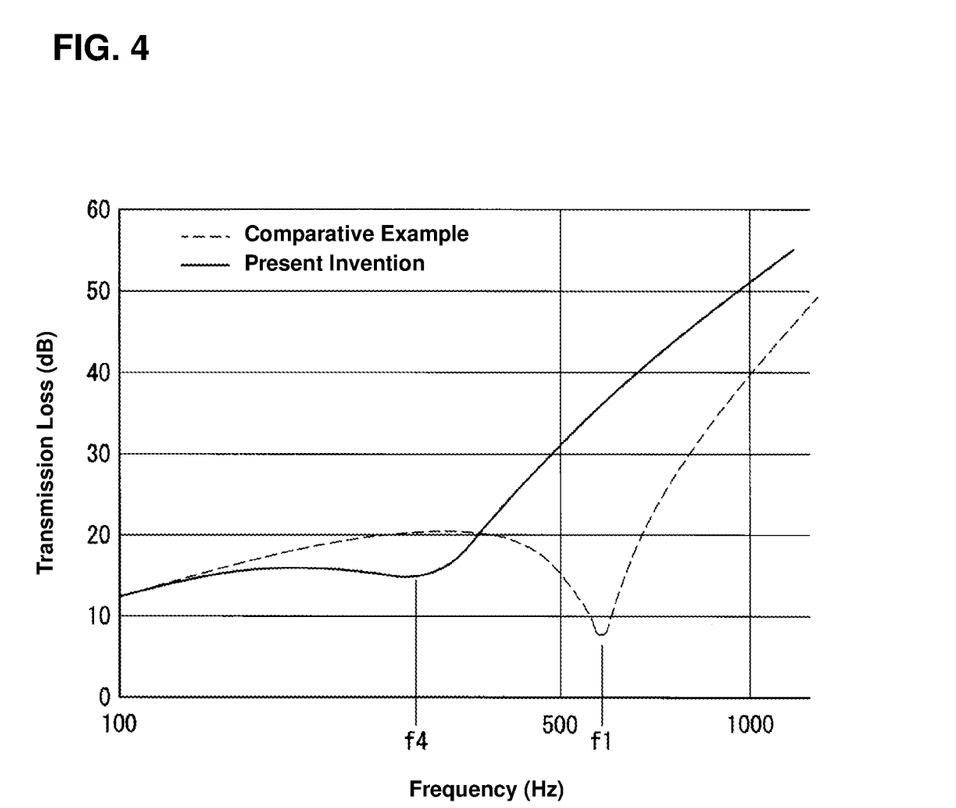
FIG. 4 is an explanatory diagram explaining an effect of a noise insulation structure of the present embodiment.

FIG. 1 shows a plan view of a vehicle-body bottom portion 2 of an automotive vehicle 1, FIG. 2 shows a sectional view taken along line A-A of FIG. 1, FIGS. 3A, 3B and 3C show explanatory diagrams explaining relationships of a volume of a sealed space S1 and a resonance transmission frequency of a resonance transmission phenomenon, and FIG. 4 shows an explanatory diagram explaining an effect of a noise insulation structure of the present embodiment.

In the figures, arrows Fr, Rr show a vehicle longitudinal direction, the arrow Fr showing a vehicle forward direction and the arrow Rr showing a vehicle rearward direction. Further, arrows Rh, Lh show a vehicle width direction, the arrow Rh showing a vehicle rightward direction and the arrow Lh showing a vehicle leftward direction. Additionally, in FIG. 2, an upper side of the figure shows a vehicle upper side and a lower side of the figure shows a vehicle lower side.

A noise insulation structure of the automotive vehicle 1 which suppresses transmission of noises occurring outside the automotive vehicle 1 to a vehicle inside through the vehicle-body bottom portion 2 partitioning the vehicle inside from a vehicle outside will be specifically described referring to FIGS. 1 through 4. The vehicle-body bottom portion 2 of the automotive vehicle 1 comprises, as shown in FIG. 1, a pair of right-and-left side sills 3 which extend in the vehicle longitudinal direction, a floor panel 4 as a floor face of the automotive vehicle 1, and two pairs of cross members 5 which are arranged on an upper face of the floor panel 4, for example.

The side sill 3 is configured to have a closed cross section taken along the vehicle width direction, specific illustration of which is omitted. The floor panel 4 has a floor tunnel portion 4a which extends in the vehicle longitudinal direction at a central portion, in the vehicle width direction, thereof between the right-and-left side sills 3. Herein, the floor panel 4 of the present embodiment is a panel member which constitutes a floor face over a range from a dash panel portion 4b which is positioned at a vehicle front portion to a rear floor panel portion 4c which is positioned at a vehicle rear portion.

The two pairs of cross members 5 are arranged at positions spaced apart from each other in the vehicle longitudinal direction as one pair of the right and left members interconnecting the floor tunnel portion 4a and the right-and-left side sills 3. More specifically, the front-side cross members 5 of the two pairs of cross members 5 connect the right-and-left side sills 3 at respective positions which correspond to a roughly central position, in the vehicle longitudinal direction, of each of the side sills 3 such that the floor tunnel portion 4a is disposed between them. Meanwhile, the rear-side cross members 5 connect the right-and-left side sills 3 at respective positions which correspond to the vicinity of a rear end, in the vehicle longitudinal direction, of each of the side sills 3 such that the floor tunnel portion 4a is disposed between them.

The cross member 5 is configured to have a roughly hat-shaped cross section taken along the vehicle longitudinal direction which extends in the vehicle width direction as shown in FIGS. 1 and 2. An engagement hole (not illustrated) for engaging a plastic clip 6 is formed at an upper face 5a of the cross member 5.

The above-described noise insulation structure for the vehicle-body bottom portion 2 comprises the vehicle-body floor portion 2, a sound-absorbing member 7 which is placed on the upper face of the floor panel 4 of the vehicle-body floor portion 2, a floor carpet 8 which is placed on the sound-absorbing member 7, and a sound-absorbing spacer 9 which is provided between the cross member 5 and the floor carpet 8, as shown in FIG. 2.

The sound-absorbing member 7 is configured to cover over part of the vehicle-body bottom portion 2 excluding the side sill 3 and the cross member 5, i.e., over the upper face of the floor panel 4. Meanwhile, the floor carpet 8 is configured in a three-dimensional shape so as to have a size covering entirely over the vehicle-body bottom portion 2 and correspond to an evenness of the vehicle-body bottom portion 2. This floor carpet 8 is fixedly attached to upper faces of the side sills 3 and the upper faces 5a of the cross members 5 by means of the plastic clips 6.

While the noise insulation structure of the automotive vehicle 1 will be described continuously, part of the noise insulation structure in the range enclosed by the two pairs of cross members 5 will be described by using the shape of its cross section taken along the vehicle longitudinal direction as shown in FIGS. 1 and 2. Herein, the shape of its cross section taken along the vehicle width direction is substantially the same as the shape of its cross section taken along the vehicle longitudinal direction except that the sound-absorbing member 7 and the floor carpet 8 are formed in a shape corresponding to the floor tunnel portion 4a and also the floor carpet 8 is fixedly attached to the upper face of the side sill 3, so descriptions of its details are omitted here.

The vehicle-body bottom portion 2 is divided into a noise-insulation inferior part X1 which is inferior in the transmission of the noises occurring outside the vehicle and a noise-insulation superior part Y1 which is relatively superior to the noise-insulation inferior part X1 in the noise insulation, compared with the noise-insulation superior part Y1, as shown in FIG. 2.

The noise-insulation inferior part X1 is, as shown in FIG. 2, the floor panel 4 which is positioned at a portion of the vehicle-body bottom portion 2 between the cross members 5, where suppressing the transmitted sound can be expected by means of the mass effect of the floor panel 4.

Meanwhile, the noise-insulation superior part Y1 is, as shown in FIG. 2, a portion which forms a closed cross section with the floor panel 4 and the cross members 5, where the suppression of the transmitted sound can be expected by means of the mass effect of the cross member 5, the air spring effect of an inner space of the closed cross section formed by the floor panel 4 and the cross member 5, and the like, in addition to the mass effect of the floor panel 4.

The sound-absorbing member 7 is made of a material having the air permeability, sound absorption, and resiliency, such as a felt combined with a fiber material, for example. This sound-absorbing member 7 is placed on the upper face of the portion of the floor panel 4 which is enclosed by the two pairs of cross members 5. In other words, the sound-absorbing member 7 is placed on the noise-insulation inferior part X1 such that both end portions, in the vehicle longitudinal direction, of the sound-absorbing member 7 are placed on joint portions of the floor panel 4 of the noise-insulation superior part Y1 and the cross members 5.

More specifically, the sound-absorbing member 7 is configured in a roughly flat-plate shape to have a longitudinal length which is roughly equal to a distance between the two pairs of cross members 5 and have a thickness which is thinner than a vertical length (height) of the cross member 5. Herein, it is preferable that the thickness of the sound-absorbing member 7 be set to be 10 mm or greater and 20 mm or smaller, and the thickness of 10 mm is adopted in the present embodiment.

The floor carpet 8 is configured in the three-dimensional shape such that a portion thereof which corresponds to the cross member 5 protrudes upward as shown in FIG. 2. Further, the floor carpet 8 is configured such that its cross section taken along the vehicle longitudinal direction and its cross section taken along the vehicle width direction form a closed cross section together with the vehicle-body bottom portion 2 in a state in which the floor carpet 8 is fixedly attached to the cross members 5 by using the plastic clips 6.

More specifically, the floor carpet 8 is formed integrally by a carpet bottom portion 81 which is placed on an upper face of the sound-absorbing member 7 and a carpet protrusion portion 82 which protrudes upward from an edge side of the carpet bottom portion 81 as shown in FIG. 2. The carpet bottom portion 81 is configured to have a longitudinal length which is roughly equal to a longitudinal length of the noise-insulation inferior part X1.

The carpet protrusion portion 82 comprises a side wall portion 82a which extends upward from an edge of the carpet bottom portion 81 and an upper face portion 82b which extends from the side wall portion 82a and is placed on the upper face 5a of the cross member 5. The carpet protrusion portion 82 forms a roughly-rectangular closed cross section together with the sound-absorbing member 7 and a side face of the cross member 5. This roughly-rectangular closed cross section is configured to be relatively long in the vehicle vertical direction.

The side wall portion 82a extends from the carpet bottom portion 81 substantially in parallel to the side face 5b of the cross member 5, being spaced apart from the side face 5b of the cross member 5.

The upper face portion 82b is configured to extend substantially horizontally from an upper end of the side wall portion 82a, facing an upper face of the noise-insulation superior part Y1, and contact the upper face 5a of the cross member 5. The upper face portion 82b has an opening hole (not illustrated) to receive the plastic clip 6 inserted therein.

The above-described floor carpet 8 forms the sealed space S1 having air layer therein together with the vehicle-body bottom portion 2 when being attached onto the vehicle-body bottom portion 2 as shown in FIG. 3A.

The noise insulation structure of the automotive vehicle 1 has a noise-insulation space S2 which is enclosed by the sound-absorbing member 7, the side face 5b of the cross member 5, and the upper face portion 82b and the side wall portion 82a of the floor carpet 8 in a range corresponding to the noise-insulation superior part Y1 as shown in FIG. 2.

This noise-insulation space S2 is a sealed space where the air permeability between the upper face 5a of the cross member 5 and the upper face portion 82b of the color carpet 8 is 5.5 cc/(cm^2·s) or lower and the air permeability between the upper face of the sound-absorbing member 7 and the floor carpet 8 is 5.5 cc/(cm^2·s) or greater and the air permeability of the sound-absorbing member 7 or smaller.

The sound-absorbing spacer 9 is placed on the upper face of the sound-absorbing member 7 in the noise-insulation space S2 which is enclosed by the carpet protrusion portion 82 of the floor carpet 8, the side face 5b of the cross member 5, and the sound-absorbing member 7.

This sound-absorbing spacer 9, which is made from synthetic resin, such as urethane foam, for example, is formed in a prismatic shape having the air permeability and resilience. Further, the sound-absorbing spacer 9 has a size so as to tightly contact the sound-absorbing member 7, the inner face of the carpet protrusion portion 82, and the side face 5b of the cross member 5.

Further, the sound-absorbing spacer 9 is configured such that the air permeability between the upper face of the sound-absorbing member 7 and the floor carpet 8 is the air permeability between the upper face 5a of the cross member 5 and the upper face portion 82b of the floor carpet 8 or greater and the air permeability of the sound-absorbing member 7 or smaller, that is −5.5 cc/(cm^2·s) or greater and the air permeability of the sound-absorbing member 7 or smaller.

Next, the effects of the above-described noise insulation structure of the automotive vehicle 1 will be described referring to FIGS. 3A, B, C and 4. First, relationships of the volume of the sealed space S1 formed by the vehicle-body bottom portion 2 and the floor carpet 8 and the resonance transmission frequency of the resonance transmission phenomenon will be explained referring to FIGS. 3A, B and C. Herein, an air layer exists only between the vehicle-body bottom portion 2 and the floor carpet 8, without the sound-absorbing member 7, as shown in FIG. 3A.

Further, as shown in FIG. 3B, a gap between the upper face of the floor panel 4 and a lower face of the carpet bottom portion 81 was set at 10 mm, a gap between the side face 5b of the cross member 5 and the side wall portion 82a of the floor carpet 8 was set as a gap L, and the volume of the sealed space S1 was changed by changing this gap L.

In this state, a radiation sound which corresponds to the noise occurring outside the automotive vehicle 1 was radiated from below the floor panel 4, and then the transmitted sound transmitted to the vehicle inside was measured and a transmission loss was calculated. Results are shown in FIG. 3C. An axis of abscissas of FIG. 3C shows the frequency and an axis of ordinate of FIG. 3C shows the transmission loss, and it is to be considered that the greater the transmission loss is, the higher the quietness of the vehicle inside is.

First, in a case in which the gap L was 0 mm, that is—the side face 5b of the cross member 5 and the side wall portion 82a of the floor carpet 8 tightly contacted each other, it was found that the transmission loss dropped due to the resonance transmission phenomenon at the frequency f1 which is higher than 500 Hz, as shown by a slender broken line in FIG. 3C.

In a case in which the gap L was 5 mm, it was found that the resonance transmission frequency of the resonance transmission phenomenon moved to the frequency f2 that was lower than the frequency f1 and also there was slight improvement in the transmission loss, as shown by a solid line in FIG. 3C.

Further, in a case in which the gap L was 20 mm, it was found that the resonance transmission frequency of the resonance transmission phenomenon moved to the frequency f3 that was lower than the frequency f1 and the frequency f2 and also lower than 500 Hz, as shown by a bold line in FIG. 3C.

Additionally, it was found that the transmission loss in a frequency band higher than the frequency f3 improved compared to those of the cases of the gap L of 0 mm or 5 mm Therefore, it was found that the larger the volume of the sealed space S1 formed by the vehicle-body bottom portion 2 and the floor carpet 8 was, the lower the resonance transmission frequency of the resonance transmission phenomenon was.

The transmission loss of the noises occurring outside the vehicle being transmitted to the vehicle inside through the floor panel 4 was measured in a state in which the sound-absorbing member 7 and the sound-absorbing spacer 9 are arranged between the floor carpet 8 and the vehicle-body bottom portion 2 which perform the above-described effects, and results of this measurement are shown in FIG. 4. Herein, results of a comparative example in which the side face 5b of the cross member 5 and the side wall portion 82a of the floor carpet 8 tightly contacted each other are shown by a slender broken line in FIG. 4.

The noise insulation structure of the automotive vehicle 1 could the results that the resonance transmission frequency f4 of the resonance transmission phenomenon was lower than the frequency f1 of the resonance transmission frequency of the comparative example and a decrease of the transmission loss at the resonance transmission frequency f4 was suppressed by adopting the above-described noise insulation structure as shown in FIG. 4. Further, it was found that there was improvement of the transmission loss in a frequency band excluding the resonance transmission frequency band, compared to the comparative example. Thus, the appropriate results, compared to the comparative example, could be obtained.

The above-described noise insulation structure of the automotive vehicle 1 can suppress the transmission sound transmitted to the vehicle inside, having the simple structure with the small number of parts. Specifically, since there exists the noise insulation space S2 between the noise-insulation superior part Y1 of the vehicle-body bottom portion 2 and the floor carpet 8, the present noise insulation structure of the automotive vehicle 1 can suppress the aerial vibration transmitted to the floor carpet 8 through the noise-insulation superior part Y1 by means of the air spring effect of the noise insulation space S2.

Further, since the sound-absorbing member 7 is provided between the noise-insulation inferior part X1 of the vehicle-body bottom portion 2 and the floor carpet 8, the present noise insulation structure of the automotive vehicle 1 can suppress the aerial vibration transmitted to the floor carpet 8 through the noise-insulation inferior part X1 by means of the sound absorption effect of the sound-absorbing member 7.

Herein, the sound-absorbing member 7 can spread the aerial vibration toward the direction crossing the vehicle vertical direction. Further, since the noise insulation space S2 is provided adjacently to the sound-absorbing member 7, the present noise insulation structure of the automotive vehicle 1 can suppress the aerial vibration which is deflected by the sound-absorbing member 7 and transmitted to the noise insulation space S2 by means of the air spring effect of the noise insulation space S2.

Thus, the present noise insulation structure of the automotive vehicle 1 can stably suppress the aerial vibration transmitted to the floor carpet 8 through the noise-insulation inferior part X1 by means of a synergistic effect of the sound absorption effect of the sound-absorbing member 7, spreading of the aerial vibration by the sound-absorbing member 7, and the air spring effect of the noise insulation space S2.

Accordingly, the present noise insulation structure of the automotive vehicle 1 can achieve the improvement of the transmission loss of the range corresponding to the noise-insulation inferior part X1 and also reduce a difference between that and the transmission loss of the range corresponding to the noise-insulation superior part Y1. Therefore, the present noise insulation structure of the automotive vehicle 1 can properly suppress the transmitted sound transmitted to the vehicle inside, having the simple structure with the small number of parts, and, in particular, can improve the noise insulation of the range corresponding to the noise-insulation inferior part X1 of the vehicle-body bottom portion 2.

Further, since the noise-insulation superior part Y1 of the vehicle-body bottom portion 2 is constituted by the floor panel 4 and the cross member 5 which is joined to the floor panel 4 so as to have the closed cross section, the noise insulation structure of the automotive vehicle 1 can suppress the aerial vibration transmitted to the floor carpet 8 by means of the mass effect of the cross member 5 and the air spring effect of the inner space enclosed by the cross member 5 and the floor panel 4. Accordingly, the noise insulation structure of the automotive vehicle 1 can improve the noise insulation of the range corresponding to the noise-insulation superior part Y1 of the vehicle-body bottom portion 2, having the simple structure with the small number of parts.

Moreover, the noise insulation structure of the automotive vehicle 1 can properly suppress the transmitted sound transmitted to the vehicle inside, having the simple structure with the small number of parts, by the floor carpet 8 including the side wall portion 82a which is spaced apart from the cross member 5.

Specifically, the noise insulation structure of the automotive vehicle 1 can expand the noise insulation space S2 adjacent to the sound-absorbing member 7 toward the vehicle inside by the cross member 5 having a longer length than the sound-absorbing member 7 in the vehicle vertical direction and the floor carpet 8 having the side wall portion 82a spaced apart from the cross member 5.

Thus, the noise insulation structure of the automotive vehicle 1 can secure the larger-sized sealed space S1, compared with a structure in which the side wall portion 82a of the floor carpet 8 tightly contacts the cross member 5.

Herein, it has been found by the inventors of the present invention that the larger the volume of the sealed space S1 is, the lower the resonance transmission frequency of the resonance transmission phenomenon which is generated by the vehicle-body bottom portion 2 and the floor carpet 8 can be made. That is, the noise insulation structure of the automotive vehicle 1 can make the resonance transmission frequency of the resonance transmission phenomenon properly low and also improve the transmission loss on the high-frequency side which is higher than the resonance transmission frequency.

Further, since the sound-absorbing member 7 tightly contacts the cross member 5 and the noise insulation space S2 is provided adjacently to the vehicle-inside side of the sound-absorbing member 7, the noise insulation structure of the automotive vehicle 1 can suppress a decrease of the transmission loss in a band of the resonance transmission frequency by means of the sound-absorbing member 7. Therefore, the noise insulation structure of the automotive vehicle 1 can properly suppress the transmitted sound transmitted to the vehicle inside, having the simple structure with the small number of parts, by making the volume of the noise insulation space S2 large.

Further, since the interior side wall portion 82a of the carpet protrusion portion 82 is arranged substantially in perpendicular to the carpet bottom portion 81 and the upper face portion 82b of the carpet protrusion portion 82, the noise insulation structure of the automotive vehicle 1 can create the noise insulation space S2 which is enclosed substantially in the rectangular shape by the floor carpet 8 and the cross member 5.

The noise insulation structure of the automotive vehicle 1 can secure the noise insulation space S2 having the larger volume, compared with a case in which the side wall portion 82a of the carpet protrusion portion 82 is arranged to cross the upper face portion 82b of the carpet protrusion portion 82, and also enhance the air spring effect of the noise insulation space S2 more properly. Thereby, the noise insulation structure of the automotive vehicle 1 can surely suppress the aerial vibration transmitted to the floor carpet 8 through the noise-insulation superior part Y1.

Additionally, since the upper face portion 82b of the carpet protrusion portion 82 faces the noise-insulation superior part Y1, the noise insulation structure of the automotive vehicle 1 can provide the large gap between the upper face portion 82b of the carpet protrusion portion 82 and the noise-insulation superior part Y1, thereby lowering the resonance transmission frequency of the resonance transmission phenomenon generated by the upper face portion 82b of the carpet protrusion portion 82 and the noise-insulation superior part Y1 more properly. Thereby, the noise insulation structure of the automotive vehicle 1 can improve the noise insulation of the range corresponding to the noise-insulation superior part Y1.

Accordingly, since the side wall portion 82a of the carpet protrusion portion 82 is arranged substantially in perpendicular to the carpet bottom portion 81 and the upper face portion 82b of the carpet protrusion portion 82, the present noise insulation structure can suppress the transmitted sound transmitted to the vehicle inside more stably.

Moreover, since the sound-absorbing spacer 9 is arranged in the noise insulation space S2, the noise insulation structure of the automotive vehicle 1 can compatibly achieve securing of an appropriate cushion performance of the floor carpet 8 and suppressing of the transmitted sound transmitted to the vehicle inside.

Specifically, if there is a space between the vehicle-body floor face and the floor carpet 8, the cushion performance of the floor carpet 8 may deteriorate partially. Consequently, there is a concern that a portion of the floor carpet 8 which corresponds to the noise insulation space S2 may deform improperly when being pressed by a passenger, so that the passenger may have some uncomfortable feeling.

However, since the sound-absorbing spacer 9 having the permeability and the resilience is arranged in the noise insulation space S2, the noise insulation structure of the automotive vehicle 1 can resiliently support the floor carpet 8 by the sound-absorbing spacer 9 when the floor carpet 8 is pressed by the passenger. Accordingly, the noise insulation structure of the automotive vehicle 1 can prevent the improper deformation of the floor carpet 8 and restrain the passenger from having the uncomfortable feeling.

Moreover, the arrangement of the sound-absorbing spacer 9 in the noise insulation space S2 can improve the noise insulation of the range corresponding to the noise-insulation superior part of the partition wall member by means of the air spring effect of the noise insulation space S2 and the sound absorption effect of the sound-absorbing spacer 9.

Thus, the noise insulation structure of the automotive vehicle 1 can compatibly achieve securing of the appropriate cushion performance of the floor carpet 8 and suppressing of the transmitted sound transmitted to the vehicle inside by means of the sound-absorbing spacer 9 arranged in the noise insulation space S2.

Embodiment 2

Another embodiment of the noise insulation structure of the automotive vehicle 1 which has a different structure of the vehicle-body bottom portion from the above-described first embodiment will be described specifically referring to FIG. 5. Herein, the same structures as the above-described first embodiment are denoted by the same character references, specific descriptions of which are omitted.

Further, the present embodiment will be described by using the shape of its cross section taken along the vehicle longitudinal direction, similarly to the above-described first embodiment, in order to facilitate the descriptions. Herein, specific descriptions of the noise insulation structure at the cross section taken along the vehicle width direction are omitted here because it is substantially the same as that at the cross section taken along the vehicle longitudinal direction. FIG. 5 shows a sectional view taken along line A-A of a vehicle-body bottom portion 10 according to the second embodiment.

Cross members 11 which have a roughly hat-shaped cross section opening upward are joined to a lower face of the floor panel 4 at the vehicle-body bottom portion 10 of the second embodiment. Herein, the cross member 11 has substantially the same shape as the first embodiment except no opening for engagement of the plastic clip 6 of the first embodiment being formed, so its specific descriptions are omitted.

Figure 5:
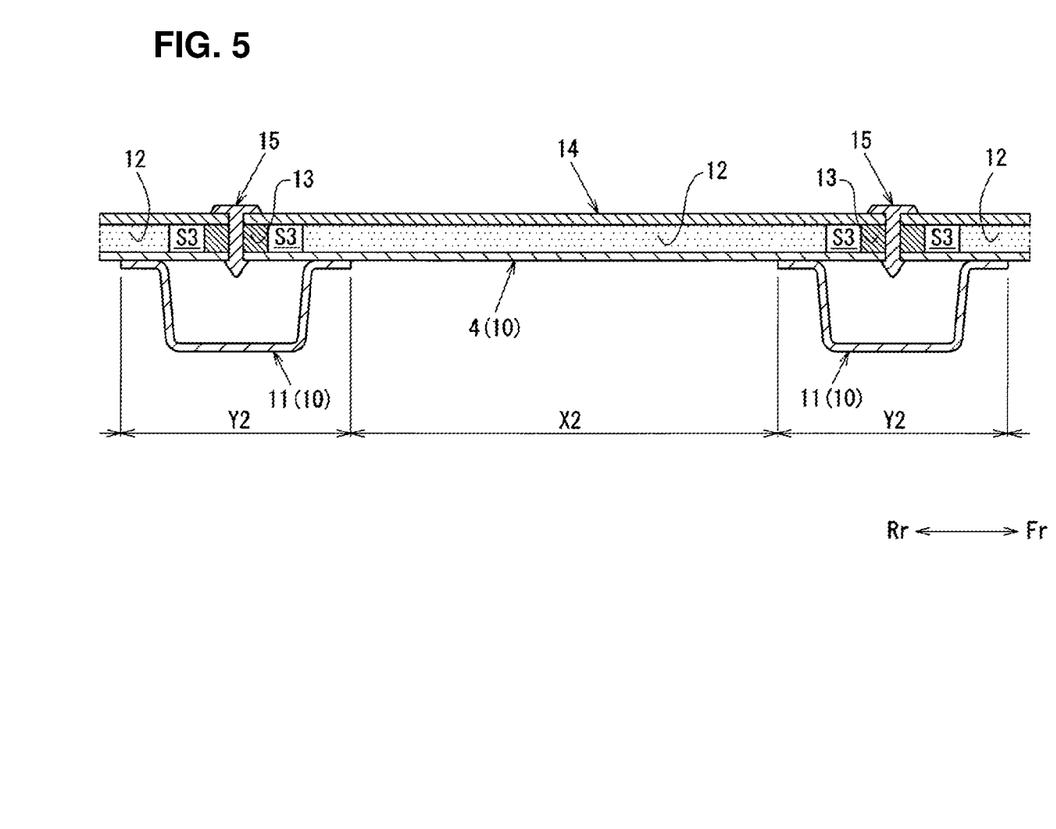
FIG. 5 is a sectional view taken along line A-A of a vehicle-body bottom portion of a second embodiment.

Further, a noise-insulation inferior part X2 of the vehicle-body bottom portion 10 is the floor panel 4 positioned between the vehicle-body bottom portion 10 and the cross members 11 as shown in FIG. 5 similarly to the first embodiment. Meanwhile, a noise-insulation superior part Y2 is a portion of a closed cross section which is formed by the floor panel 4 and the cross members 11 as shown in FIG. 5 similarly to the first embodiment.

The noise insulation structure for the above-described vehicle-body bottom portion 10 comprises, as shown in FIG. 5, a sound-absorbing member 12 which is placed on the noise-insulation inferior part X2, sealing connection portions 13 which are placed on the noise-insulation superior parts Y2, a floor carpet 14 which is placed on the sealing connection portions 13, and plastic clips 15 which engage with engagement holes (not illustrated) of the floor carpet 4 and fix the sealing connection portions 13 and the floor carpet 14 to the floor panel 4.

The sound-absorbing member 12 is similar to the first embodiment, so its specific descriptions are omitted here. Herein, the sound-absorbing member 12 is, as shown in FIG. 5, placed on the noise-insulation inferior part X2 such that both end portions, in the vehicle longitudinal direction, thereof are placed on upper faces of the noise-insulation superior parts Y2.

The sealing connection portion 13 is, as shown in FIG. 5, configured to have a shorter longitudinal length than a length, in the vehicle longitudinal length, of the noise-insulation superior part Y2 and have substantially the same thickness as the sound-absorbing member 12.

This sealing connection portion 13 is made from a material having the high air-permeability, such as synthetic rubber or metal, and formed in a shape which corresponds to the noise-insulation superior part Y2. Herein, an insertion hole (not illustrated) to receive insertion of the plastic clip 15 is formed at the sealing connection portion 13.

The floor carpet 14 is formed in a roughly flat-plate shape facing the floor panel 4 as shown in FIG. 5. The floor carpet 14 is fixedly attached to the floor panel together with the sealing connection portions 13 integrally by means of the plastic clips 15.

The noise insulation structure of the automotive vehicle 1 of the second embodiment includes noise insulation spaces S3 which are enclosed by the noise-absorbing member 12 and the sealing connection portions 13 between the floor panel 4 and the floor carpet 14.

The above-described noise insulation structure of the automotive vehicle 1 can stably suppress the aerial vibration transmitted to the floor carpet 14 through the noise-insulation inferior part X2 by means of the synergistic effect of the sound absorption effect of the sound-absorbing member 7, the spreading of the aerial vibration by the sound-absorbing member 7, and the air spring effect of the noise insulation space S3.

Accordingly, the present noise insulation structure of the automotive vehicle 1 can properly suppress the transmitted sound transmitted to the vehicle inside, having the simple structure with the small number of parts, and, in particular, can improve the noise insulation of the range corresponding to the noise-insulation inferior part X2 of the vehicle-body bottom portion 10, similarly to the first embodiment.

Further, since the noise-insulation superior part Y2 of the vehicle-body bottom portion 10 is constituted by the floor panel 4 and the cross member 11 which is joined to the floor panel 4 so as to have the closed cross section, the noise insulation structure of the automotive vehicle 1 can suppress the aerial vibration transmitted to the floor carpet 4 by means of the mass effect of the cross member 11 and the air spring effect of the inner space enclosed by the cross member 11 and the floor panel 4. Accordingly, the noise insulation structure of the automotive vehicle 1 can improve the noise insulation of the range corresponding to the noise-insulation superior part Y2 of the vehicle-body bottom portion 10, having the simple structure with the small number of parts.

In correspondence between the present invention and the above-described embodiments, the partition wall member of the present invention corresponds to the vehicle-body bottom portion 2, 10 of the embodiments. Likewise, the interior member corresponds to the floor carpets 8, 14, the sealing connection portion corresponds to the side sill 3, the cross members 5, 11, and the sealing connection portion 13, the space corresponds to the noise insulation spaces S2, S3, the panel member corresponds to the floor panel 4, the protrusion member corresponds to the side sill 3 and the cross members 5, 11, the vehicle inward-outward direction corresponds to the vehicle vertical direction, the interior contact portion corresponds to the carpet bottom portion 81 of the floor carpet 8, the interior attachment portion corresponds to the upper face portion 82*b* of the floor carpet 8, the interior side wall portion corresponds to the side wall portion 82*a* of the floor carpet 8, and the spacer corresponds to the sound-absorbing spacer 9.

However, the present invention should not be limited to the above-described embodiments, and any other modifications or improvements may be applied within the scope of a spirit of the present invention.

For example, while the sound-absorbing spacer 9 is arranged in the portion enclosed by the carpet protrusion portion 82 of the floor carpet 8, the side face 5*b* of the cross member 5, and the sound-absorbing member 7 in the above-described first embodiment, this sound-absorbing spacer may be omitted. In this case, some resilient spacer having the resiliency may be arranged in place of the sound-absorbing spacer 9 in order to prevent deformation of the floor carpet 8.

Figure 6:
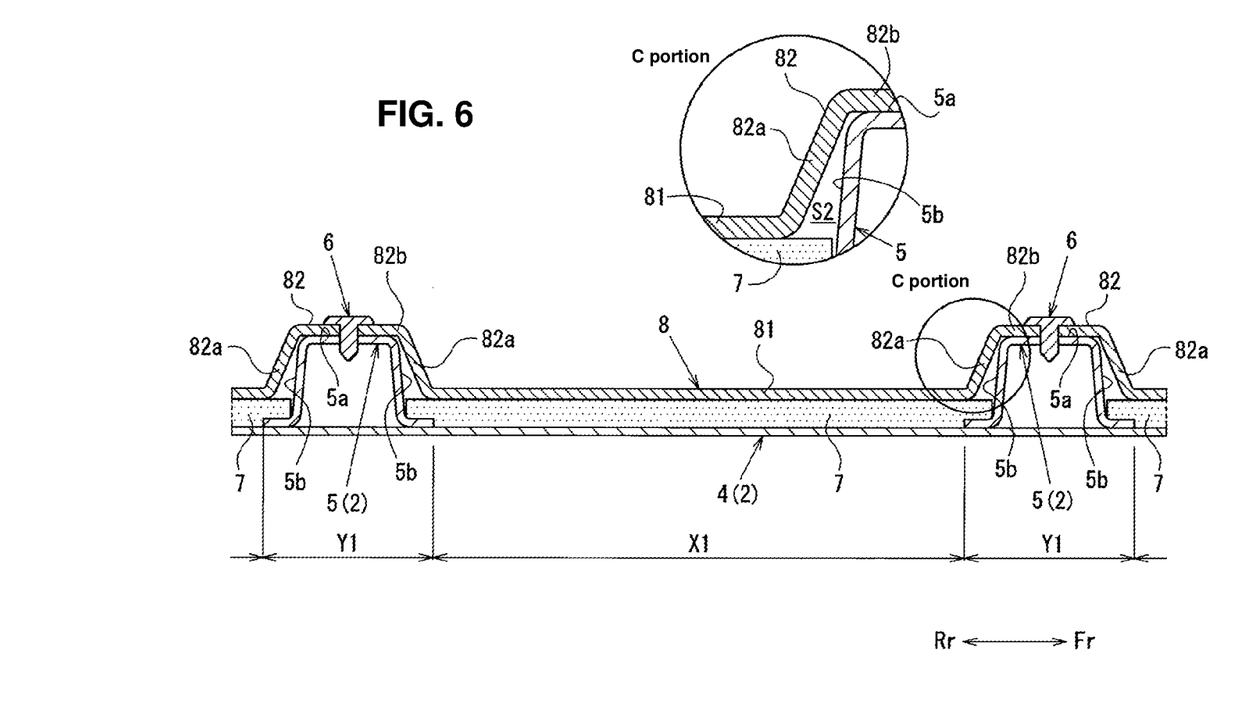
FIG. 6 is a sectional view taken along line A-A of a vehicle-body bottom portion of a modification.

Further, while the carpet protrusion portion 82 is configured such that the portion enclosed by the side wall portion 82*a* of the floor carpet 8, the sound-absorbing member 7, and the side face 5*b* of the cross member 5 has the roughly rectangular-shaped closed cross section, this carpet protrusion portion may be configured such that the portion enclosed by the side wall portion 82*a*, the sound-absorbing member 7, and the side face 5*b* of the cross member 5 has a roughly triangular-shaped closed cross section as shown in FIG. 6 which shows a sectional view taken along line A-A of a modification.

Moreover, while the sound-absorbing member 7 and the floor carpet 8 are formed along the floor tunnel 4*a*, the sound-absorbing member 7 may be formed in a shape corresponding to a portion of the floor panel 4 which is enclosed by the floor tunnel portion 4*a*, one of the side sills 3, and a pair of cross members 5.

In this case, a portion of the floor carpet 8 which faces the side face of the floor tunnel portion 4*a* is configured to be spaced apart from the side face of the floor tunnel portion 4*a*. Thereby, since a space can be created between the side face of the floor tunnel portion 4*a* and the floor carpet 8, the same effects as the above-described embodiment can be obtained.

Also, while the sound-absorbing spacer 9 is configured such that the air-permeability between the upper face of the sound-absorbing member 7 and the floor carpet 8 becomes the desired one, this sound-absorbing spacer 9 may be configured such that a sealing degree between the upper face of the sound-absorbing member 7 and the floor carpet 8 becomes a desired one. Herein, the sealing degree means a ratio of an area excluding the gap relative to an entire area.

For example, in a case in which the sealing degree between the upper face 5a of the cross member 5 and the upper face portion 82b of the floor carpet 8 is 97.1% or greater, the sound-absorbing spacer 9 may be configured such that the sealing degree between the upper face of the sound-absorbing member 7 and the floor carpet 8 becomes 84.4% or greater and smaller than 97.1%.

Moreover, while the air-permeability between the upper face of the sound-absorbing member 7 and the floor carpet 8 is adjusted by means of the sound-absorbing spacer 9 so as to be the air-permeability between the upper face 5a of the cross member 5 and the upper face portion 82b of the floor carpet 8 or greater and the air-permeability of the sound-absorbing member 7 or smaller, any means can be applied as long as the above-described relationships of the air-permeability is achieved. For example, the air-permeability between the upper face of the sound-absorbing member 7 and the noise insulation space S2 may be adjusted so as to be a desired one by properly setting the gap between the cross member 5 and the floor carpet 8.

Further, while the sound-absorbing member 12, the noise insulation space S3, and the sealing connection portion 13 are provided between the floor panel 4 and the floor carpet 4 in the above-described second embodiment, a spacer having the air-permeability and flexibility may be arranged in the noise insulation space S3.

Also, while the noise insulation structure of the vehicle-body bottom portions 2, 10 are described in the above-described first and second embodiments, the present noise insulation may be applied to a vehicle-body side face, such as a door or fender, or a vehicle-body upper face, such as a bonnet (engine hood) or roof, for example.

In this case, the partition wall member partitioning the vehicle inside from the vehicle outside may be covered with a member having the rigidity, such as a synthetic-resin made trim, in place of the floor carpets 8, 14. Thereby, the same effects as the above-described embodiments can be obtained as well. In this case, a gap between the partition wall member and the trim may be sealed by a portion which protrudes from the trim in place of the sealing connection portion 13 of the second embodiment.

Additionally, while the cross members 5, 11 are configured to have the roughly hat-shaped cross section in the above-described embodiments, any shaped cross section can be applied as long as a closed cross section is formed together with the floor panel 4. For example, a cross member having a honeycomb structure therein can be used.

What is claimed is:

1. A noise insulation structure of an automotive vehicle, comprising:
   a partition wall member partitioning a vehicle inside from a vehicle outside;
   an interior member provided to be spaced apart, toward the vehicle inside, from the partition wall member; and
   a sound-absorbing member provided between the partition wall member and the interior member,
   wherein said partition wall member comprises a noise-insulation inferior part which is inferior in vehicle-outside noise insulation and a noise-insulation superior part which is provided adjacently to a periphery of the noise-insulation inferior part and superior to the noise-insulation inferior part in the vehicle-outside noise insulation, and
   between said partition wall member and said interior member are provided said sound-absorbing member which is arranged between said noise-insulation inferior part of the partition wall member and said interior member, a sealing connection portion which connects said noise-insulation superior part of the partition wall member and said interior member and seals a gap between the partition wall member and the interior member, and a space which is adjacent to said sound-absorbing member and said sealing connection portion and enclosed by the sound-absorbing member and the sealing connection portion.

2. The noise insulation structure of the automotive vehicle of claim 1, wherein said noise-insulation superior part of the partition wall member comprises a panel member which partitions the vehicle inside from the vehicle outside and a protruding member which includes a flat face provided to be spaced apart, toward the vehicle inside and/or the vehicle outside, from said panel member and is joined to the panel member so as to have a closed cross section.

3. The noise insulation structure of the automotive vehicle of claim 1, wherein said sealing connection portion is configured to have a longer length, in a vehicle inward-outward direction, than said sound-absorbing member, and said interior member is made integrally by an interior contact portion which contacts the sound-absorbing member, an interior attachment portion which is fixedly attached to the sealing connection portion, and an interior side wall portion which connects said interior contact portion and said interior attachment portion and is provided to be spaced apart from the sealing connection portion.

4. The noise insulation structure of the automotive vehicle of claim 2, wherein said sealing connection portion is configured to have a longer length, in a vehicle inward-outward direction, than said sound-absorbing member, and said interior member is made integrally by an interior contact portion which contacts the sound-absorbing member, an interior attachment portion which is fixedly attached to the sealing connection portion, and an interior side wall portion which connects said interior contact portion and said interior attachment portion and is provided to be spaced apart from the sealing connection portion.

5. The noise insulation structure of the automotive vehicle of claim 3, wherein said interior side wall portion of the interior member is arranged substantially in perpendicular to said interior contact portion and said interior attachment portion.

6. The noise insulation structure of the automotive vehicle of claim 4, wherein said interior side wall portion of the interior member is arranged substantially in perpendicular to said interior contact portion and said interior attachment portion.

7. The noise insulation structure of the automotive vehicle of claim 1, wherein said partition wall member is a vehicle-body bottom portion of the automotive vehicle, said interior member is a floor carpet, and an air-permeable and resilient spacer is arranged in said space.

8. The noise insulation structure of the automotive vehicle of claim 2, wherein said partition wall member is a vehicle-body bottom portion of the automotive vehicle, said interior member is a floor carpet, and an air-permeable and resilient spacer is arranged in said space.

9. The noise insulation structure of the automotive vehicle of claim 3, wherein said partition wall member is a vehicle-body bottom portion of the automotive vehicle, said interior member is a floor carpet, and an air-permeable and resilient spacer is arranged in said space.

10. The noise insulation structure of the automotive vehicle of claim 4, wherein said partition wall member is a vehicle-body bottom portion of the automotive vehicle, said interior member is a floor carpet, and an air-permeable and resilient spacer is arranged in said space.

11. The noise insulation structure of the automotive vehicle of claim 5, wherein said partition wall member is a vehicle-body bottom portion of the automotive vehicle, said interior member is a floor carpet, and an air-permeable and resilient spacer is arranged in said space.

12. The noise insulation structure of the automotive vehicle of claim 6, wherein said partition wall member is a vehicle-body bottom portion of the automotive vehicle, said interior member is a floor carpet, and an air-permeable and resilient spacer is arranged in said space.

13. A noise insulation structure of an automotive vehicle, comprising:
   a partition wall member partitioning a vehicle inside from a vehicle outside;
   an interior member provided to be spaced apart, toward the vehicle inside, from the partition wall member; and
   a sound-absorbing member provided between the partition wall member and the interior member,
   wherein said partition wall member comprises a noise-insulation inferior part which is inferior in vehicle-outside noise insulation and a noise-insulation superior part which is provided adjacently to a periphery of the noise-insulation inferior part and superior to the noise-insulation inferior part in the vehicle-outside noise insulation,
   between said partition wall member and said interior member are provided said sound-absorbing member which is arranged between said noise-insulation inferior part of the partition wall member and said interior member, a sealing connection portion which connects said noise-insulation superior part of the partition wall member and said interior member and seals a gap between the partition wall member and the interior member, and a space which is adjacent to said sound-absorbing member and said sealing connection portion and enclosed by the sound-absorbing member and the sealing connection portion,
   said noise-insulation superior part of the partition wall member comprises a panel member which partitions the vehicle inside from the vehicle outside and a protruding member which includes a flat face provided to be spaced apart, toward the vehicle inside and/or the vehicle outside, from said panel member and is joined to the panel member so as to have a closed cross section,
   said sealing connection portion is configured to have a longer length, in a vehicle inward-outward direction, than said sound-absorbing member, and said interior member is made integrally by an interior contact portion which contacts the sound-absorbing member, an interior attachment portion which is fixedly attached to the sealing connection portion, and an interior side wall portion which connects said interior contact portion and said interior attachment portion and is provided to be spaced apart from the sealing connection portion,
   said interior side wall portion of the interior member is arranged substantially in perpendicular to said interior contact portion and said interior attachment portion, and
   said partition wall member is a vehicle-body bottom portion of the automotive vehicle, said interior member is a floor carpet, and an air-permeable and resilient spacer is arranged in said space.

* * * * *